3,297,646
PROCESS FOR THE PRODUCTION OF HIGH MOLECULAR WEIGHT POLYOXYMETHYLENE
Julius Bernsmann, Marl, Germany, assignor to Chemische Werke Huls Aktiengesellschaft, Marl, Germany, a corporation of Germany
No Drawing. Filed Oct. 9, 1964, Ser. No. 402,929
Claims priority, application Germany, Oct. 18, 1963, C 31,174
1 Claim. (Cl. 260—67)

It is known that monomeric, anhydrous formaldehyde can be polymerized in indifferent solvents in the presence of polymerization catalysts such as aliphatic and aromatic amines, hydrazines, arsines and aminoxides. It is also known that formaldehyde can be polymerized in indifferent solvents in the presence of acid catalysts. Other catalysts such as the carbonyls of the metals of group VIII of the periodic system of Mendeléeff, metalloorganic compounds, alcoholates, phenolates, quarternary ammonium and phosphonium compounds and tertiary sulfonium compounds also have been mentioned.

It has now been found that high molecular weight polyoxymethylene is produced by the polymerization of monomeric, water-free formaldehyde in indifferent organic solvents in the presence of dissolved or suspended catalyst compounds having the ylid structure.

The name ylid is used herein to designate organic compounds having a half-polar bond which have been described for instance in Louis F. and Mary F. Fieser, Advanced Organic Chemistry, Reinhold Publishing Corp., New York, 1961, pages 482–484.

The catalysts compounds having the ylid structure can be made from quarternary ammonium or phosphonium salts e.g. $[(C_6H_5)_3YC_nH_{2n+1}]X$, in which X is a halogen and Y is a nitrogen or phosphorus atom by the action of proton acceptors such as metal alkyls or metal aryls or a base in inert solvents under the exclusion of air. Tertiary sulfonium salts also may be used for the production of the ylid compounds. Ylid compounds can be obtained also by the additions of carbene [1] to a phosphine. For example triphenylphosphine in pentane reacts with chloroform in the presence of potassium-tert.-butoxide to form triphenylphosphonium dichloromethylid. Although many nitrogen ylid compounds are extraordinarily unstable the phosphorus ylid compounds are relatively stable. Compounds of ylid structure are known which are stable to air and water and can be made by the treatment of onium salts with aqueous sodium hydroxide. The ylid compounds have the structure (I)   

in which $R_1$ stands for a cyclopentadienyl group which may be alkylated or arylated or an indenyl group or a fluorenyl group, X stands for phosphorus or nitrogen and each $R_2$ stands for an alkyl or aryl group, or the structure (II)  

in which each $R_3$ stands for a phenyl group, Y stands for phosphorus, $R_4$ stands for hydrogen or a halogen and $R_5$ stands for hydrogen, a halogen or an alkyl group, or the structure (III) 

[1] The entity: $CH_2$ a methylene group with a lone electron pair, is known as carbene (C. F. Fieser and Mary Fieser, "Advanced Organic Chemistry, Reinhold Publishing Corp., New York, 1961, p. 536–541).

in which $R_6$ stands for a cyclopentadienyl, indenyl or fluorenyl group or the structure

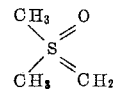

For instance the triphenylphosphonium-cyclopentadiene ylid and the pyridinium-cyclopentadiene ylid are outstanding catalysts for the polymerization of monomeric formaldehyde.

Liquids which are inert to both formaldehyde and to the new catalyst such as ether, aromatic hydrocarbon such as benzene, toluene, xylene and ethylbenzene etc. and aliphatic hydrocarbons such as petroleum ether, benzine and ligroin and chlorinated aliphatic and aromatic compounds may serve as the organic solvents for the polymerization.

The new catalysts may be used in a wide range of concentrations without significant influence upon the physical properties of the polymerization products such as the reduced viscosity or the elasticity of films and press plates made therefrom. Suitably the catalysts are used in amounts within the range from 1 to 100 mg. and preferably about 50 mg. per liter of the organic solvent.

The polymerization can be carried out at the boiling temperature of the solvent, suitably under reflux or at lower temperatures. Since the reaction mixture is heated by the heat liberated by the polymerization reaction external cooling may be expident. It is advantageous, in order to produce a homogeneous polymer, to carry out the process at a uniform temperature preferably between −60 and +100° C. and especially between 0 and 40° C. and with a uniform introduction of the formaldehyde.

The reduced viscosities of the polymer products vary widely depending upon the catalyst used. The lowest viscosity value was measured on the polymer product obtained with the triphenylphosphonium-methylid, triphenylphosphonium - monochloromethylid and triphenylphosphonium-trichloromethylid compounds while a higher reduced viscosity value was observed for the polymer product obtained by the use of the triphenylphosphonium cyclopentadiene ylid compound as the polymerization catalyst. The solvent also has an influence upon the viscosity of the product. For example the products obtained with benzene as the polymerization medium generally have a lower reduced viscosity value than products made with benzine as the medium. Thus it is within the choice of the operator of the process to produce polymers having special properties under the same polymerization conditions by the choice of the ylid compound and/or the solvent and especially by the choice of ylid compound and solvent mixtures.

The ylid compounds, due to their completely different physical and chemical properties from the onium salts represent a new class of compounds for the initiation of the polymerization of monomer formaldehyde. They are distinguished further by their good solubility in organic solvents. They can moreover readily be washed out of the polymer with organic solvent.

The polymer product obtained with the aid of these catalysts is in almost quantitative yield. It is a special advantage as compared with other catalysts that the extremely small loss of yield can be recovered by a subsequent acetylation of the polyoxymethylene with acetic anhydride.

The ylid compounds react normally with the carbonyl groups of the aldehydes and ketones by exchange of the carbonyl oxygen for a methyl group with the formation of an olefinic double bond. It was therefore in no way to be expected that monomeric and water-free formaldehyde for example by the addition of triphenylphosphonium-methylid in benzene or benzine would give no ethylene but polymeric formaldehyde in quantitative yield.

In the following examples specific reaction conditions with regard to temperature, speed of introduction, solvent etc. are specified. It is a special advantage however that the new catalyst can be used under extraordinarily widely varied conditions.

The monomeric formaldehyde was made and purified as follows: 600 g. of paraformaldehyde were cautiously heated with stirring with 280 g. of phosphorus pentoxide in 700 cm.³ of paraffine oil and the formaldehyde vapor thus formed was passed first through two serially connected coolers at −20° C. and then collected in a storage vessel at −80° C. During the pyrolysis dry nitrogen was passed through the apparatus. After completion of the reaction the storage vessel at −80° C. containing the bulk of the monomeric formaldehyde was separated from the other apparatus. The formaldehyde that collected in the coolers at −20° C. contained impurities and was discarded.

In order to characterize the polymer product the relative viscosity of a solution thereof containing 0.5 g. per 100 cm.³ in N,N'-dimethylformamide containing 2% of diphenylamine was measured at 135° C.

The polymer product was dried and acetylated with acetic anhydride and sodium acetate as described in Example 46 of British Patent No. 770,717 and then stabilized by the addition of 1% by weight of each of allantoin and m-dinitrobenzene. Press plates 0.5 mm. thick were made from the product at 200° C.

Example 1

200 g. of formaldehyde were distilled over a period of 1 hour into a solution of 0.25 g. of triphenylphosphonium-cyclopentadienylid in 5 l. of benzine while stirring the latter in a 6 liter flask. The formaldehyde polymerized immediately with liberation of heat. The reaction vessel was maintained at 18° C. by cooling. During the reaction pure nitrogen was passed through the apparatus. After the reaction the mass was stirred for 30 minutes and the precipitate was separated by filtration and washed with 2 liters of benzene. The product was then dried first in air and then in a vacuum. The product was 190 g. of a snow white polymer the reduced viscosity of which was 1.7. By acetylation a yield of 98% was obtained. The press plates made therefrom were flexible and very elastic. The polymerization takes place in the same way when a monoalkyl or monoaryl substituted ylid on the cyclopentadiene group is used instead of the triphenylphosphonium-cyclopentadienylid and does not depend upon the position of the substitution. For example triphenylphosphonium-monomethyl - monoethyl- and monophenyl - cyclopentadiene ylids are suitable. The same results are obtained by the use of trimethylammoniumcyclopentadienylid, triethylammoniumcyclopentadienylid, tributylammoniumfluorenylid, trihexylammoniumfluorenylid, trimethylammoniumindenylid, trioctadecylammoniumindenylid or with the corresponding phosphonium derivatives.

The polymerization remains unchanged when the benzine solvent is substituted by other paraffine hydrocarbons such as hexane or by alkyl aromatic hydrocarbons such as toluene, ethylbenzene, xylene and mesitylene or by halogenated hydrocarbons such as methylene chloride, chloroform, ethylene chloride and trichloroethylene. The viscosity of the product and the yield also are unchanged when 5 g. or 5 mg. of catalyst is used instead of 0.25 g.

Example 2

The process of Example 1 was repeated excepting that the temperature in the reaction vessel was maintained at 40° C. The yield was 96% and the reduced viscosity 1.4. After acetylation the yield was 96%. The press plates were very flexible and elastic. The introduction of the monomeric formaldehyde at 0° C. over a period of 2 hours gave a 90% yield of a product having a reduced viscosity of 1.8. After the acetylation the yield amounted to 95%. The press plates were flexible and elastic.

Example 3

The process was carried out as in Example 1 excepting that benzene was used as the solvent. The yield was 95%. The product had a reduced viscosity of 0.8. After acetylation the yield was 93%. The press plates were very flexible and elastic.

Example 4

200 g. of formaldehyde was distilled over a period of 1 hour into a well stirred solution of 0.25 g. of triphenylphosphonium-methylid in 4 liters of benzene in a 6 liter flask. The formaldehyde polymerized immediately with liberation of heat. The reaction vessel was cooled to 18° C. Nitrogen was introduced into the reaction vessel during the reaction. The product was recovered as in Example 1. The yield was 90%. The product had a reduced viscosity of 0.6. After acetylation the yield was 85%. The press plates were flexible and elastic. The polymerization can be carried out in the same manner with the triphenyl-phosphonium-ethylid, -n-propylid or -i-butylid. The polymerization was carried out with the same results also in the presence of triphenylphosphonium-dichloro- or monochloro-methylid, triphenylphosphonium-dibromo- or monobromobutylid or dimethylsulfoxonium-methylid.

Example 5

The process of Example 1 was repeated with the exception that 0.25 g. of pyridiniumcyclopentadienylid was used as the initiator. The initiator was dissolved in 50 cm.³ of benzene and introduced into the reaction vessel which contained 5 liters of benzine. Then 200 g. of formaldehyde was distilled into the solution. The reaction vessel was cooled to 18° C. The yield was 96%. The reduced viscosity of the product was 0.7. After acetylation the yield was 92%. The press plates were flexible and elastic.

The same results were obtained when pyridiniumindenylid or pyridiniumfluorenylid was used as the initiator.

I claim:

Process for the polymerization of formaldehyde which comprises introducing monomeric, water-free formaldehyde into an agitated solution of a catalytic compound selected from the group consisting of compounds of the formula

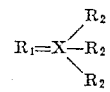

in which $R_1$ stands for a member selected from the group consisting of the cyclopentadienyl group, the monomethyl-, monoethyl- and monophenyl-cyclopentadiene groups, the indenyl group and the fluorenyl group, X stands for a member selected from the group consisting of phosphorus and nitrogen, and $R_2$ stands for a member selected from the group consisting of alkyl groups containing up to 18 carbon atoms and of the phenyl group, structures of the formula

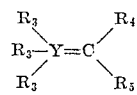

in which $R_3$ stands for a phenyl group, Y stands for phosphorus, $R_4$ stands for a member selected from the group consisting of hydrogen, chlorine and bromine, and $R_5$ stands for a member selected from the group consisting of hydrogen, chlorine and bromine and alkyl groups containing up to 4 carbon atoms, and structures of the formula

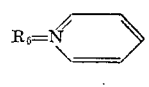

in which $R_6$ stands for a member selected from the group consisting of cyclopentadienyl, indenyl and fluorenyl groups and the structures of the formula

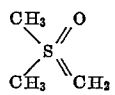

in a liquid organic solvent which is inert to both formaldehyde and the catalyst.

References Cited by the Examiner
UNITED STATES PATENTS 2,848,437 8/1958 Langsdorf et al. _____ 260—67
2,994,687 8/1961 Goodman et al. _____ 260—67

WILLIAM H. SHORT, *Primary Examiner.*

L. M. MILLER, *Assistant Examiner.*